United States Patent Office 3,336,362

Patented Aug. 15, 1967

3,336,362

CYCLOALKYL ALLYL PHTHALATE ESTERS

John William Hirzy, St. Louis, Mo., assignor to Monsanto Company, a corporation of Delaware No Drawing. Filed Jan. 30, 1964, Ser. No. 341,412
3 Claims. (Cl. 260—475)

This invention relates to a new class of chemical compounds. More particularly, this invention relates to novel allyl cycloalkyl phthalate esters. The compounds have been found to be useful as polymerizable plasticizers and monomers.

The novel allyl cycloalkyl phthalate esters have the general formula,

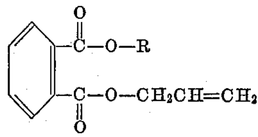

where R is cyclohexyl, cycloheptyl and alkylated cycloalkyl having from 6 to 15 carbon atoms.

It is a primary object of this invention to provide novel allyl cycloalkyl phthalate esters.

A further object is to provide a novel class of allyl cycloalkyl phthalate esters which are useful as polymerizable plasticizers.

Other and different objects, features and advantages of this invention will become apparent to those skilled in the art upon consideration of the following detailed description thereof and the examples attendant thereto.

It has been found that the heretofore described allyl cycloalkyl phthalate esters can be readily prepared by heating, at a temperature of from about 50° C. to about 200° C., in equimolar quantities, a phthalic acid anhydride, a cycloalkanol, a tertiary amine and allyl chloride.

The cycloalkyl radicals can be derived from various sources such as alcohols, including alcohols produced by the catalytic air oxidation of cycloalkanes or alcohols obtained by the catalytic hydrogenation of phenol or mixed cresols. Illustrative examples of cycloalkyl radicals are 2-methylcyclopentyl, 3-methylcyclopentyl, 2,4-dimethylcyclopentyl, cyclohexyl, 3-methylcyclohexyl, 4-methylcyclohexyl, 3,5-dimethylcyclohexyl, 3,3-dimethylcyclohexyl, 3-ethylcyclohexyl, 4-ethylcyclohexyl, propylcyclohexyl, 3-isopropylcyclohexyl, 4-isopropylcyclohexyl, methylcyclohexylethyl, butylcyclohexyl, hexylcyclohexyl, octylcyclohexyl, 3 - nonylcyclohexyl, 4 - nonylcyclohexyl, 3,3,5 - trimethylcyclohexyl, cycloheptyl, 2,4-dimethylcycloheptyl, 2,3,5-trimethylcycloheptyl and the like.

Tertiary amines suitable for use in preparing the compounds of this invention can be represented by the formula, $$R_3-\underset{}{\overset{R}{\overset{|}{N}}}-R_2$$

wherein:

$R_1$, $R_2$ and $R_3$ are like or unlike saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, methyldiethylamine, dimethylethylamine, dimethylcyclohexylamine, dimethylhexylamine, diethylhexylamine, dimethyldecylamine and the like.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

*Example I*

A suitable reaction vessel is charged with 592.0 grams (4.0 moles) of phthalic anhydride and 440.0 grams (4.4 moles) of cyclohexanol. The mixture is heated to about 105° C. There is then added 444.0 grams (4.4 moles) of allyl chloride. The reaction mixture is held at a temperature of about 130° C. for about nine hours and then washed several times with water and aqueous sodium carbonate washes. The reaction mixture is then steam sparged and dehydrated under vacuum. There is obtained 806.0 grams (90% of theory) of cyclohexyl allyl phthalate having a specific gravity at 25° C. of 1.110 and an index of refraction at 25° C. of 1.5203.

*Example II*

Following the procedure of Example I, 370.0 grams (2.5 moles) of phthalic anhydride, 350.0 grams (2.7 moles) of 3,5-dimethylcyclohexanol, 210.0 grams (2.75 moles) of allyl chloride and 278.0 grams (2.75 moles) of triethylamine are utilized to prepare 3,5-dimethylcyclohexyl allyl phthalates in excellent yield.

*Example III*

Following the procedure in Example I, 370.0 grams (2.5 moles) of phthalic anhydride, 415.0 grams (2.7 moles) of 4-nonylcyclohexanol, 210.0 grams (2.75 moles) of allyl chloride and 278.0 grams (2.75 moles) of triethylamine are utilized to prepare 4-nonylcyclohexyl allyl phthalate in good yield.

As previously stated, the products of this invention are useful as plasticizers for vinyl halide-containing polymers. The advantageous properties imparted by the esters of this invention will be more fully understood by reference to the following examples.

The following testing procedures are used in evaluating the physical properties of plasticizers.

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at lower temperatures. Low-temperature flexibility tests herein employed are according to the Clash-Berg method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized composition's usefulness as an elastomer.

*Water resistance.*—The mount of water absorption and the amount of water leaching that take place when the plasticized composition is immersed in distilled water for 24 hours is determined.

*Kerosene extraction.*—Resistance to kerosene is measured as follows: A 2" diameter 40 mil disc is suspended in a 50° C. oven for a 3-hour conditioning period to eliminate water. It is then cooled and weighed. The conditioned sample is then immersed in 400 ml. of kerosene for a period of 24 hours at 23° C. The sample is removed from kerosene, blotted dry and suspended in a force-draft 80° C. oven for 24 hours. The sample is then cooled and weighed. The percent loss in weight is reported as the kerosene extraction value.

The following example illustrates the advantageous and unexpected results which are achieved by the use of the esters of the present invention in vinyl halide-containing polymers, but it is not intended that the invention be limited by or to such example.

*Example IV*

One hundred parts of polyvinyl chloride and sixty parts by weight of cyclohexyl allyl phthalate, obtained in Example I, are mixed on a rolling mill to a homogeneous blend. During the milling substantially no fuming or discoloration is observed. The molded sheet of the mixture is clear, transparent and substantially colorless. Testing of the molded sheet for low-temperature flexibility yields a value of −3.1° C. Tests of the water-resistance of the plasticized material show a solids loss of 0.44% and a 0.55% water absorption value. A kerosene extraction value of 1.5% is obtained on this composition.

Other compounds within the scope of this invention are found to impart properties of a similar nature.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A compound of the formula

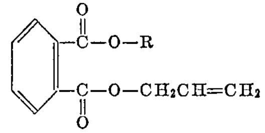

wherein:

R is a radical selected from the group consisting of cyclohexyl, cycloheptyl and alkylated cycloalkyl having from 6 to 15 carbon atoms.

2. Cyclohexyl allyl phthalate.

3. 4-nonylcyclohexyl allyl phthalate.

References Cited

UNITED STATES PATENTS 2,275,467 3/1942 Pollack et al. ------- 260—475

RICHARD K. JACKSON, *Primary Examiner.*

L. A. WEINBERGER, T. L. GALLOWAY, *Assistant Examiners.*